(12) United States Patent
Nonaka

(10) Patent No.: US 6,222,996 B1
(45) Date of Patent: Apr. 24, 2001

(54) CAMERA WITH DISTANCE MEASURING APPARATUS FOR PREFERENTIALLY CONTROLLING PASSIVE AND ACTIVE TYPE AF SYSTEM

(75) Inventor: Osamu Nonaka, Sagamihara (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/349,221

(22) Filed: Jul. 7, 1999

(30) Foreign Application Priority Data

Jul. 15, 1998 (JP) .................................................. 10-200430

(51) Int. Cl.⁷ ...................................................... G03B 13/36
(52) U.S. Cl. ......................... 396/104; 396/106; 396/109; 396/123
(58) Field of Search ..................................... 396/100, 106, 396/104, 109, 234, 121, 122, 123

(56) References Cited

U.S. PATENT DOCUMENTS

| | | | |
|---|---|---|---|
| 4,255,029 | * 3/1981 | Freudenschuss | 396/104 |
| 4,697,904 | * 10/1987 | Takahashi et al. | 396/106 |
| 4,980,716 | * 12/1990 | Suzuki et al. | 396/104 |
| 5,315,342 | * 5/1994 | Cocca | 396/104 |
| 5,652,926 | 7/1997 | Saito . | |
| 5,655,160 | * 8/1997 | Saito | 396/106 |
| 5,848,301 | * 12/1998 | Nonaka | 396/106 |
| 5,870,178 | * 2/1999 | Egawa et al. | 396/106 |
| 5,915,233 | 6/1999 | Nonaka . | |
| 5,963,308 | * 10/1999 | Takasaki et al. | 396/106 |

FOREIGN PATENT DOCUMENTS 60-105270   6/1985   (JP) .

* cited by examiner

*Primary Examiner*—W. B. Perkey
(74) *Attorney, Agent, or Firm*—Frishauf, Holtz, Goodman, Langer & Chick, P.C.

(57) ABSTRACT

A camera with a distance measuring apparatus has distance measuring functions by means of an active system and a passive system to allow good distance measurement with respect to an object in a wide variety of conditions. The camera includes a first signal forming unit, a second signal forming unit, a release detecting unit, an object condition detecting unit and a selective control unit. The first signal forming unit projects light distance measurement light from a light projecting unit, receives a reflection signal of the distance measurement light from the object at a light receiving unit and forms a focusing signal for the object. The second signal forming unit monitors the luminance distribution state of the object using an image signal detecting unit and forms a focusing signal for the object. The release detecting unit detects whether or not a release operating member is operated. The object condition detecting unit detects an object condition based on a signal obtained by actuating either the first signal forming unit or the second signal forming unit before the operation of the release operating member. The selective control unit selectively controls either the first signal forming unit or the second signal forming unit based on the detection result of the object condition detecting unit if the release detecting unit detects the operation of the release operating member.

23 Claims, 10 Drawing Sheets

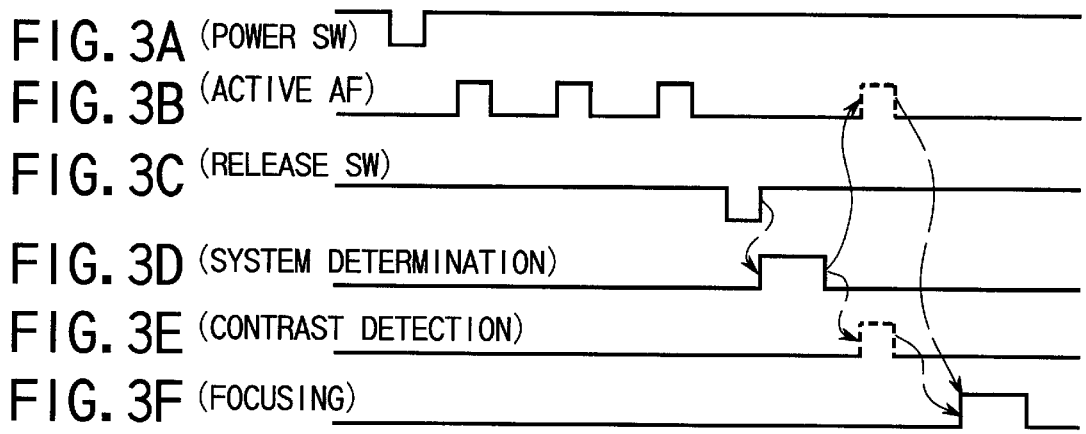
FIG. 3A (POWER SW)
FIG. 3B (ACTIVE AF)
FIG. 3C (RELEASE SW)
FIG. 3D (SYSTEM DETERMINATION)
FIG. 3E (CONTRAST DETECTION)
FIG. 3F (FOCUSING)
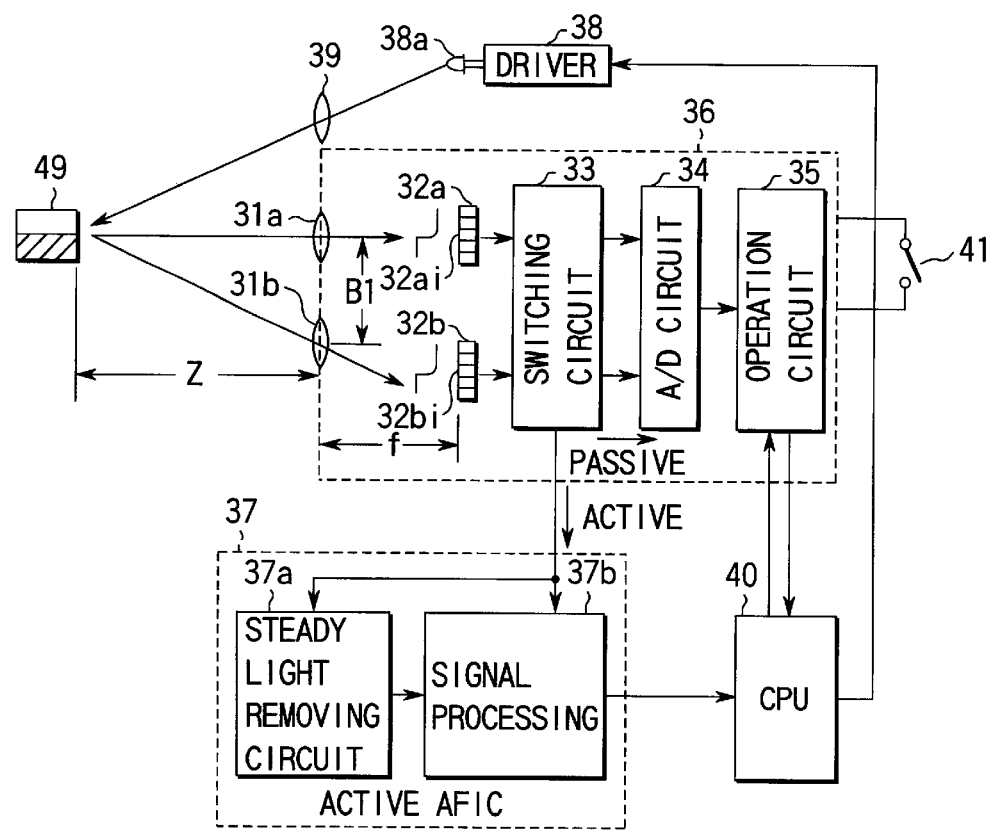
FIG. 4

SENSOR CELL POSITION

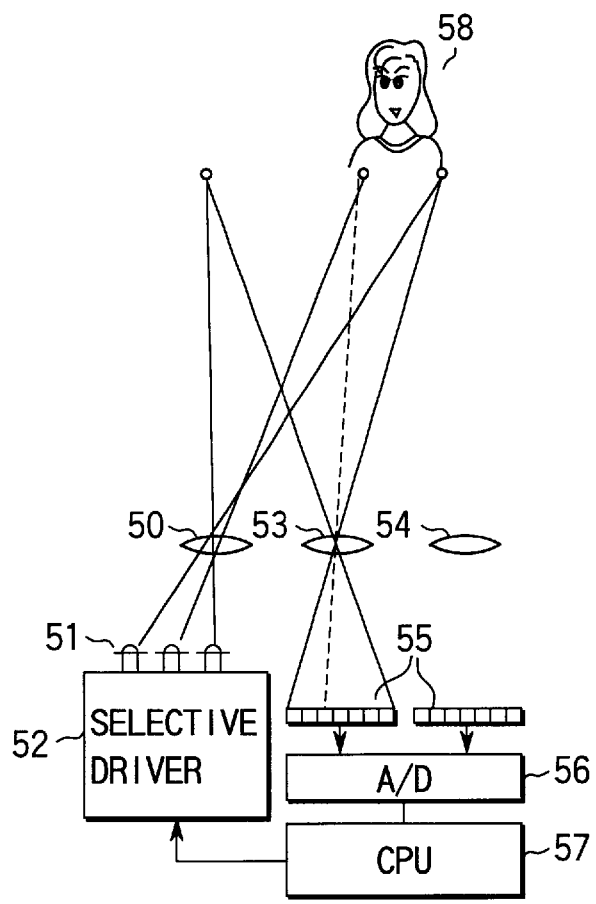
FIG. 15
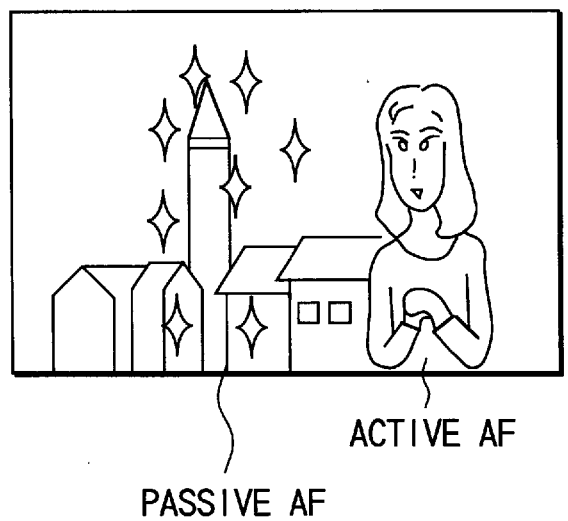
FIG. 17   PASSIVE AF   ACTIVE AF

CAMERA WITH DISTANCE MEASURING APPARATUS FOR PREFERENTIALLY CONTROLLING PASSIVE AND ACTIVE TYPE AF SYSTEM

BACKGROUND OF THE INVENTION

The present invention relates to a camera, and in particular to a camera with a distance measuring apparatus having various functions which are selectively utilized to measure information on the distance to an object.

Conventionally, the following two systems are adopted for an auto focus (AF) distance measuring apparatus for a camera, namely, an "active type AF system" using a reference signal light applied onto an object from the camera and a "passive type AF system" using the luminance distribution information on the object.

The former "active type AF system" is capable of measuring a distance to an object in a dark environment or a distance to a low contrast object without a luminance distribution. However, the accuracy for measuring an object at a long distance which cannot be reached by reflection light is low.

The latter passive type AF system, by contrast, can provide stable distance measurement for both an object at a short distance and an object at a long distance. Conversely, however, the passive type AF system is basically incapable of measuring a distance to an object in a dark environment or a distance to a low contrast object.

If both of the "active type AF system" and the "passive type AF system" are adopted, it is possible to accurately measure a distance to an object using one or the other of the active and passive type AF systems.

Nevertheless, in the case of adopting the both systems, the camera is disadvantageous in terms of cost and space. Due to this, there has been little chances of actually producing a camera provided with the both systems.

Under these circumstances, there is disclosed, for example, a technique related to "a light projection type range finder and a photoelectric transfer apparatus" capable of efficiently providing these two systems in a small space. See Jpn. Pat. Appln. KOKAI Publication No. 60-105270.

The photoelectric transfer apparatus disclosed in the above mentioned Japanese patent application is provided with sensor arrays for transferring light to electric charges and two series of capacitors for storing electric charges, and extracts signal light in an active AF manner in accordance with the difference in storage charges between the time at which distance measurement light is projected and that no distance measurement light is projected.

Further, this photoelectric transfer apparatus detects images in a passive AF mode based on the arrangement of the charges stored in the respective sensor arrays.

In U.S. Pat. No. 5,652,926, there is also disclosed a technique related to "a distance measuring apparatus" provided with an active system measuring unit and a passive system distance measuring unit, wherein it is determined whether environmental luminance is at a high level or at a low level, and whereby the active system distance measuring unit is utilized if the environmental luminance is low and the passive system distance measuring unit is utilized if it is high.

This U.S. Pat. No. 5,652,926 also discloses a technique related to "a distance measuring apparatus for a camera" provided with an active system distance measuring unit and an active type distance measuring unit, wherein the active system unit is caused to conduct distance measurement once, if the measurement value of the active system unit is lower than a predetermined value, and whereby the measurement value is adopted if it is higher than the predetermined value, adopting a measurement value of the passive system distance measuring unit.

Moreover, in U.S. Pat. No. 5,915,233, there is disclosed a technique related to a "distance measuring apparatus" wherein a passive system is normally adopted and the quantity of light of reflection signal light is detected using only distance measurement light, so that a distance to an object can be calculated is the object has either low luminance or a low contrast.

Next, the switching between the active system and the passive system according to the conventional technique as well as the problem thereof will be described with reference to FIG. 13.

FIG. 13 is a flow chart showing a normal control sequence for focusing a camera having AF functions of two systems, i.e., the active system and the passive system.

Specifically, until it is detected that a release switch is depressed (in step S1), a sub-routine for displaying the number of modes provided in a finder or at a dram of the camera and that of photographic frames is repeated (in step S2).

Then, if it is detected that the release switch is depressed, light is measured for exposure (in step S3) and an AF sequence is executed (in steps S4 to S10). Based on these steps, focus adjustment (in step S11) and shutter control (exposure control) (in step S12) are conducted.

In this sequence, the active system AF is first conducted in step S4 in order to take full advantage of the active and passive systems. Then, a distance to the object is calculated from a reflection light positional signal obtained by the step S4 (in step S5). Based on the result, it is determined whether to conduct the passive system AF (in step S6).

Thereafter, if the result of the step S6 is "NO", that is, the result of the active AF system is appropriate, focusing adjustment is instantly conducted.

In addition, if the result of the step S6 is "YES", that is, the result of the active AF system is inappropriate, the processing moves to the integrating operation of the passive AF system (in step S7) and focusing control is conducted by calculating a distance using an image signal in steps S8 to S11).

In this sequence, if the result of the step S6 is "YES", the camera executes both the active and passive AF systems. Clearly, therefore, this technique requires quite a lot of time.

As can be seen from the above, a conventional camera having two AF systems of the active and passive systems has disadvantages in that it is necessary to determine which of the measurement results of the active and passive systems should be utilized for focusing. As a result so-called release time lag occurs during the determination, whereby a photographer misses shutter timing due to the time lag.

BRIEF SUMMARY OF THE INVENTION

The present invention has been made in consideration of the above disadvantages. It is, therefore, an object of the present invention to provide a camera with a distance measuring apparatus capable of solving the problem of missed shutter timing due to release time lag, and to provide a small-size, high-speed camera system which has distance measuring functions of both an active AF system and a passive AF system to thereby allow good distance measurement with respect to objects in wide variety of conditions.

To obtain the above object, according to the first aspect of the present invention, there is provided a camera with a distance measuring apparatus comprising:

light projecting means for projecting signal light onto an object;

first signal means, having light receiving means for receiving reflection signal light of the signal light from the object, for forming a signal used for measuring a distance to the object;

second signal means having image signal detecting means for detecting an image signal of the object, for forming a signal used for measuring the distance to the object;

photographing start detecting means for detecting that a photographing start operating means operates when a photographer is to take a photograph;

actuating means for setting the camera in an operating state; and control means for obtaining a signal by actuating one of the first and second signal means before the photographing start detecting means detects operation of the photographing start operating means and after actuating the actuating means, and for determining a priority as to actuating one of the first and second signal means at timing after the photographing start detecting means detects the operation of the photographing start operating member based on the signal.

According to the second aspect of the present invention, there is provided a camera with a distance measuring apparatus comprising:

first signal forming means, having light projecting means for projecting distance measurement light onto an object and light receiving means for receiving a reflection signal of the distance measurement light from the object, for forming a focusing signal for the object;

second signal forming means, having an image signal detecting unit monitoring a luminance distribution state of the object, for forming a focusing signal for the object;

release detecting means for detecting that a photographer operates a release operating member;

object condition detecting means for detecting an object condition based on a signal obtained by operating one of the first signal forming means and the second signal forming means before operation of the release operating member; and selective control means for selectively controlling the first signal forming means and the second signal forming means to use one of the first signal forming means and the second signal forming means so as to obtain the focusing signal for the object based on a detection result of the object condition detecting means if the release detecting means detects the operation of the release operating member.

According to the third aspect of the present invention, there is provided a camera with a distance measuring apparatus comprising:

first signal forming means, having light projecting means for projecting distance measurement light onto an object and light receiving means for receiving a reflection signal of the distance measurement light from the object, for forming a focusing signal for the object;

second signal forming means, having an image signal detecting means monitoring a luminance distribution state of the object, for forming a focusing signal for the object based on the image signal detecting means;

release detecting means for detecting that a photographer operates a release operating member;

object condition detecting means for detecting an object condition based on a signal obtained by actuating the first signal forming means before operation of the release operating member; and selective control means for selectively controlling the first signal forming means and the second signal forming means to use one of the first signal forming means and the second signal forming means so as to obtain the focusing signal for the object based on a detection result of the object condition detecting means if the release detecting means detects the operation of the release operating member.

According to the fourth aspect of the present invention, there is provided a camera with a distance measuring apparatus comprising:

first signal forming means, having light projecting means for projecting distance measurement light onto an object and light receiving means for receiving a reflection signal of the distance measurement light from the object, for forming a focusing signal for the object;

second signal forming means, having an image signal detecting means monitoring a luminance distribution state of the object, for forming a focusing signal for the object based on the image signal detecting means;

release detecting means for detecting that a photographer operates a release operating member;

object condition detecting means for detecting an object condition based on a signal obtained by actuating the image signal detecting means before operation of the release operating member; and selective control means for selectively controlling the first signal forming means and the second signal forming means to use one of the first signal forming means and the second signal forming means so as to obtain the focusing signal for the object based on a detection result of the object condition detecting means if the release detecting means detects the operation of the release operating member.

According to the fifth aspect of the present invention, there is provided a camera with a distance measuring apparatus comprising:

first distance measuring means, having a plurality of light emitting means for measuring distances to a plurality of points in an image plan, for projecting distance measurement light from the light emitting means onto an object in the image plane and for receiving and utilizing reflection light of the distance measurement light;

second distance measuring means for utilizing an image signal pattern of the object in the image plane;

determining means for determining an object condition based on an image signal outputted by actuating the second distance measuring means; and control means for selecting one of the plurality of light emitting means included in the distance measuring means to allow the selected light emitting means to project distance measurement light based on a result of the determining means.

According to the sixth aspect of the present invention, there is provided a camera comprising:

a detecting unit detecting a luminance distribution state of an object;

a passive distance measuring unit measuring a distance to the object based on an output of the detecting unit;

an active distance measuring unit projecting distance measuring light onto the object and measuring a distance to the object based on a light receiving position of a reflection light of the distance measurement light; and a selective controlling unit selectively controlling driving a photographing lens using an output signal of one of the passive distance measuring unit and the active distance measuring unit based on the luminance distribution state detected by the detecting unit so as to make a photographing optical system in a focusing state.

According to the seventh aspect of the present invention, there is provided a camera comprising:

image detecting means for detecting an image of an object;

first focusing signal forming means for forming a signal for focusing the camera on the object in accordance with an output of the image detecting means;

second focusing signal forming means for projecting distance measurement light onto the object, for detecting a position of a reflection light of the distance measurement light and for forming a signal for focusing the camera on the object; and determining means for determining which of the first and second focusing signal forming means is actuated, based on an output obtained by actuating the image detecting means.

According to the eighth aspect of the present invention, there is provided a camera comprising:

image detecting means for detecting an image of an object;

first focusing signal forming means forming a signal for focusing the camera on the object in accordance with an output of the image detecting means;

second focusing signal forming means for projecting distance measurement light in a plurality of directions in an image plane, for detecting a position of a reflection signal light of the distance measurement light; and measurement light; and selecting means selecting the plurality of distance measurement lights in accordance with an output signal of the image detecting means after actuating the image detecting means and at timing before actuating the first focusing signal forming means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 3A through 3F are timing charts for explaining selective control sequences for an active system and a passive system;

FIG. 4 is a block diagram of important parts showing the outline of a camera with a distance measuring apparatus in the second embodiment according to the present invention;

FIG. 15 shows the constitution of an application of the camera with a distance measuring apparatus in the second embodiment according to the present invention;

FIG. 17 shows a scene in which an object is not at the center on a plane.

DETAILED DESCRIPTION OF THE INVENTION

Figure 1:
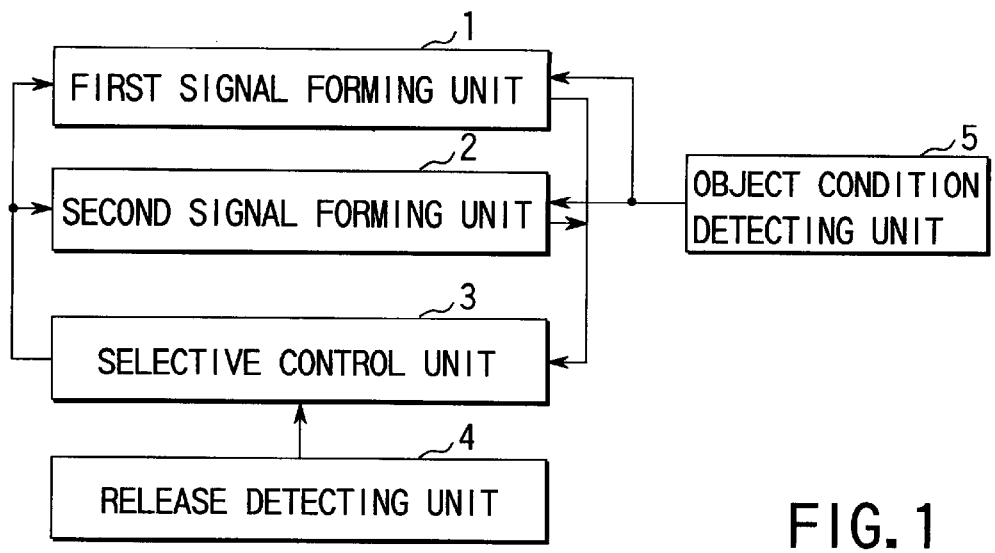
FIG. 1 is a block diagram showing the conceptual constitution of a camera with a distance measuring apparatus according to the present invention.

Reference will now be made in detail to the presently preferred embodiments of the invention as illustrated in the accompanying drawings, in which like reference characters designate like or corresponding parts throughout the several drawings.

The embodiments of the invention will be described with reference to the accompanying drawings.

First, FIG. 1 is the conceptual view of a camera with a distance measuring apparatus according to the present invention.

As shown in FIG. 1, the camera with a distance measuring apparatus of the present invention includes at least a first signal forming unit 1, a second signal forming unit 2, a selective control unit 3, a release detecting unit 4 and an object condition detecting unit 5. The camera with a distance measuring apparatus is formed by connecting those constituent elements as shown in FIG. 1.

The first signal forming unit 1 has a light projecting unit and a light receiving unit described later. A distance measuring light is projected from the light projecting unit, a reflection signal of the distance measuring light reflected by an object is received by the light receiving unit and a focusing signal for the object is formed.

The second signal forming unit 2 has an image signal detecting unit described later. The image signal detecting unit monitors a luminance distribution state using light constantly applied onto the object, and forms a focusing signal for the object.

The release detecting unit 4 detects that a photographer has operated a release operating member described later.

The object condition detecting unit 5 operates either the first or second signal forming unit 1 or 2 before the operation of the release operating member and detects the condition of the object based on the obtained signal.

The selective control unit 3 selectively controls the first and second signal forming unit 1 and 2 so as to obtain a focusing signal for the object based on the detection result of the object condition detecting unit 5 when the release detecting unit 4 detects the operation of the release operating member.

In this way, the camera with a distance measuring apparatus of the present invention selects one of the two focusing systems; a passive system and an active system before a release switch as the release operating member is depressed and takes control as if one of the systems is already selected by the time the release is turned on. By so doing, release time lag is removed.

As a result, according to the present invention, focusing is effected by the system which has been selected through sufficient judgment without considering processing time at which either of the system should be selected, whereby more accurate focusing can be expected.

Figure 2:
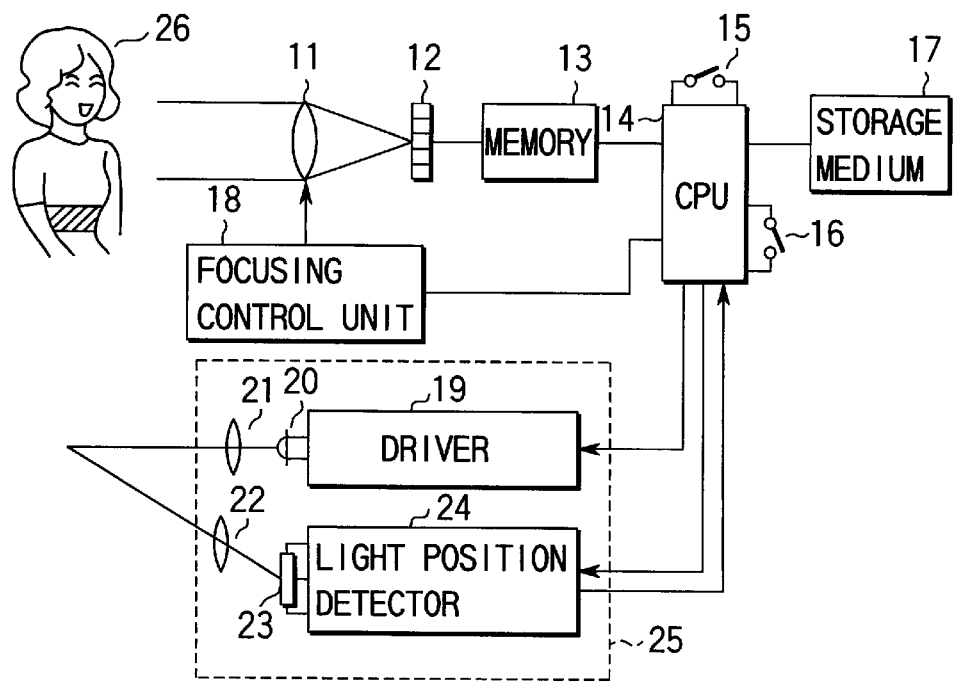
FIG. 2 is a block diagram showing the constitution of a camera with a distance measuring apparatus in a first embodiment according to the present invention.

FIG. 2 is a block diagram showing the constitution of a camera with a distance measuring apparatus in the first embodiment according to the present invention.

This embodiment concerns a case where the present invention is applied to a digital camera for photographing an object using an image pickup device.

In FIG. 2, an image of an object 26 is formed on an image pickup device 12 such as a CCD by a photographing lens 11. An image signal from the image pickup device 12 is stored in a memory 13 provided in a later stage in a synchronous manner with timing at which the release switch 15 as the release operating member is turned on.

A CPU 14, comprising of a one-chip microcomputer and the like, compresses the image signal stored in the memory 13 into a predetermined format and records the resultant signal in a storage medium 17. The CPU 14 also assumes control of the respective elements including a focusing control unit 18.

An active type AF unit 25 includes a driver circuit 19 receiving an output from the CPU, an infrared light emitting diode 20 connected to the driver circuit 19 and serving as a light projecting unit, a light projecting lens 21 arranged in front of the infrared light emitting diode 20, a light receiving lens 22 serving as a light receiving unit forming an image of a reflection light from the object, a light position detecting unit (referred to as 'PSD' hereinafter) 23 and an integrated circuit (referred to as 'AFIC') 24.

The CPU 14 controls the driver circuit 19 at a predetermined timing to project light from the infrared light emitting diode 20.

After projecting light, an image of the reflection light from the object 26 is formed on the PDS 23 through the light receiving lens 22.

The PSD 23 outputs a current signal dependent on the position of incident signal light.

The AFIC 24 amplifies the current signal, performs an analog operation, converts the current signal into a signal according to a distance to the object and outputs the resultant signal to the CPU 14.

The CPU 14 performs an operation to determine a focusing position based on the signal from the AFIC 24.

Since the distance between the light projecting lens 21 and the light receiving lens 22 is constant, the incident position of the reflection signal light from the object 26 on the PSD 23 is changed in accordance with the distance to the object.

That is, if the distance to the object 26 is short, the reflection light is incident on a position distant from a light projection system, whereas if the distance to the object 26 is long, the reflection light is incident on a position close to the light projection system.

The active AF unit 25 functions to determine the distance to the object by means of a tigonometrical survey system.

Meanwhile, if all of the constituent elements for the camera system having as the above-stated circuit blocks are constantly powered, a battery is consumed quickly.

Normally, therefore, there is provided a power switch 16 to appropriately switch on the respective elements only when the camera is used.

A normal electronic camera employs a focusing system in which a contrast is determined while moving the photographing lens 11 to provide the highest contrast of an image signal obtained at the image pickup device 12 to thereby allow the CPU 14 to determine an optimum focusing position. However, if the object has a low contrast or the object is in a dark environment, sufficient accuracy cannot be obtained.

Considering the above factors, this embodiment is intended to correctly measure the distance to the object even in the above-described situations by employing the active system AF unit 25.

Namely, focusing control is conducted with respect to an object in a dark environment or that with a low contrast based on the distance measurement result of the active type AF, thereby increasing the number of targets whose distances can be measured with high accuracy.

Nevertheless, it is difficult to simultaneously operate the active type AF system and the passive type AF system. If focusing position is sequentially determined based on the both types of AF system, the problem of long release time lag occurs as described in 'Description of the Related Art'.

The active type AF is not appropriate for a distant object or a black object. In those cases, use of the contrast system is preferable.

Now, the selective control sequence of the active system and that of the passive system will be described with reference to the timing charts shown in FIGS. 3A through 3F.

As shown in FIGS. 3A through 3F, if the power switch 16 is turned on, the active system AF is actuated at certain intervals to thereby allow the CPU 14 to determine rough distance information in advance of a time at which a photographer depresses the release switch 15.

When the release switch 15 is depressed based on the information thus obtained, the CPU 14 determines whether focusing operation should be conducted by the contrast system or the active system. If the measurement result prior to the operation of the release switch 15 indicates a long distance, the contrast system is used to conduct focusing operation.

By comparison, if the distance measurement result prior to the operation of the release switch 15 indicates a short distance, for which the accuracy of the active system AF is higher than that of the contrast system, the active system AF is re-executed to thereby conduct focusing operation.

The reason that this embodiment adopts the active type AF to measure a distance prior to the operation of the release switch is that the active system AF is capable of measuring a distance at higher speed than that of the contrast system.

That is to say, the contrast system occasionally determines the contrast of the obtained image while moving the lens as stated above. Due to this, the power to move the lens is unnecessarily consumed. From the viewpoint of energy saving, it is advantageous to employ the active AF first.

As described above, in the first embodiment of the present invention, the CPU 14 determines which system is appropriate from the distance measurement result obtained in advance. While operating the release switch 15, focusing control is conducted by means of the selected system, with the result that it is possible to provide a camera with a distance measuring apparatus without causing time loss and without missing shutter timing.

In the first embodiment, the present invention is assumed to be applied to a digital camera including an image pickup device used as a photographing system. Needless to say, the present invention is applicable to focusing control for other cameras such as a so-called "silver camera".

If the present invention is applied to the silver camera which does not include an image pickup device as a photographing system, an optical system dedicated to distance measurement and an image detecting device may be sometimes additionally provided and focusing control is conducted by means of the passive type AF.

Furthermore, the active AF for radiating infrared is made use of in many cameras.

In addition, these functions are often jointly used and an image pickup device for passive AF is used for a light receiving device for active AF.

A camera with a distance measuring apparatus in a second embodiment according to the present invention is assumed to be applied to an image pickup camera having the above constitution.

FIG. 4 is a block diagram of important parts showing the schematic constitution of the camera with a distance measuring apparatus in the second embodiment according to the present invention.

The distance measuring apparatus in this embodiment mainly consists of a CPU 40 serving as control means for assuming control of the overall measuring apparatus, a distance measuring unit 36 for introducing distance measurement light and conducting distance measuring processing, an LED driver 38 and a light emitting diode (LED) 38a serving as light projecting means and an AFIC 37 serving as a detecting circuit for active AF. This apparatus is capable of executing distance measurement both in the first distance measurement mode, i.e., a passive AF mode and in the second distance measuring mode, i.e., an active AF mode.

In FIG. 4, a switch denoted by a reference symbol 41 is a release switch corresponding to the release switch 15 in FIG. 3. The switch may be a remote control switch actuated upon receiving a remote control signal from a remote controller which is not shown in FIG. 4.

In case of measuring a distance in the passive AF mode in the distance measuring apparatus in this embodiment, sensor arrays 32a and 32b for passive AF incorporated in the distance measuring unit 36 are used.

Then, light is introduced from an object 49 by the sensor arrays 32a and 32b and the outputs of sensor cells which are light receiving devices for the sensor arrays 32a and 32b are introduced through a switching circuit 33 into integrating means.

The output of each of the sensor cells is converted from an analog to a digital signal by an analog/digital (A/D) converter circuit 34 incorporating therein an integrating circuit serving as the integrating means. Thereafter, image displacement quantities on the sensor arrays 32a and 32b are operated by an operating circuit 35.

In addition, the operating circuit 35 operates a distance Z to an object based on the image displacement quantities.

On the other hand, if distance measurement is conducted in the active AF mode, the LED 38a serving as light projecting means emits light and projects a pulse-like signal light toward the object 49. The reflection light is introduced to one sensor array 32b of the two sensor arrays 32a and 32b.

Further the outputs of the sensor cells in the sensor array 32b are separated from the A/D converter circuit 34 incorporating the integrating circuit by the switching circuit 33 incorporated in the distance measuring unit 36. The outputs are inputted into the active AFIC 37 as a combined output.

The AFIC 37 obtains a distance to the object based on the information on the image of the object by means of the trigonometric survey system.

Based on the information on the distance to the object obtained in the respective modes, a focusing lens is fed to the object focusing position by a focusing drive control unit which is not shown.

Next, the distance measuring apparatus will be described in detail.

In this distance measuring apparatus, as shown in FIG. 4, two light receiving lenses 31a and 31b are arranged spaced apart from each other by a base length B1 or parallax and two sensor arrays 32a and 32b are arranged at a focal length f to the lenses.

In the passive AF mode, a distance Z to object is obtained based on the luminance pattern image shifted quantities of the object 49 on the sensor arrays 32a and 32b due to the parallax.

That is, the object light is incident on the sensor arrays 32a and 32b through the light receiving lenses 31a and 31b.

The outputs of the sensor arrays 32a and 32b are introduced into the A/D converter circuit 34 in units of sensor cell through the switching circuit 33. After being integrated, the outputs are converted from analog to digital signals.

The operating circuit 35 operates the object distance Z based on the digital information from the A/D converter circuit 34.

In the active AF mode, on the other hand, pulse-like light emitted from the light emitting diode (LED) 38 serving as light projecting means is converged onto the light projecting lens 39 and then projected onto the object 49.

The reflection light from the object 49 is incident on the sensor array 32b through one of the light receiving lenses 31b.

At this moment, the output of the sensor array 32b is inputted into the active AFIC 37 serving as the detecting circuit in such a way that outputs of the respective cells are combined.

In other words, described later, the outputs of the sensor array 32b are halved at the central portion of the array in the switching circuit 33 and outputted as combined output.

The AFIC 37 comprises of a steady light removing circuit 37a and a signal processing circuit 37b.

First, a well-known steady light removing circuit 37a functions to remove light other than the signal light constantly incident on the sensor array 32b, that is, photocurrent based on background light is removed, whereby only the pulse-like photocurrent components based on the signal light are subjected to processing by the signal processing circuit 37b.

As described above, in the distance measuring apparatus in this embodiment, the switching circuit 33 can switch over the sensor arrays to individually deal with the output signals of the sensor arrays and to deal with the respective outputs by adding them.

It is noted that the output line of the sensor array 321 is not connected to the AFIC 37 if the mode is switched to the active AF mode and it functions only in the passive AF mode.

Next, a method of calculating the distance of relative positions of the luminance pattern of the distance measuring apparatus in the passive AF mode described with reference to FIG. 4, will be described in more detail.

The relative positional difference x of the distribution of light incident on the sensor arrays 32a and 32b is changed depending on the object distance Z because of the base length B1 which is a distance by which the light receiving lenses 31a and 31b are spaced apart.

That is, if the focal lengths of the light receiving lenses 31a and 31b are assumed as f, the object distance Z is obtained as:

$$z = B1 \cdot f / x \tag{1}$$

The sensor cells of the sensor arrays 32a and 32b then output current signals in accordance with the quantity of incident light.

The outputs of the current signals are converted to digital signals by the A/D converter circuit 34 including the integrating circuit serving as integrating means for integrating the current signals.

The relative positional difference x can be obtained if the image shift quantity operating circuit 35 performs a correlation operation base on the distal signals.

The result is inputted to the CPU 40 comprising a one-chip microcomputer or the like and serving as operation control means. In the CPU 40, the above expression (1) is operated to thereby obtain the object distance Z.

This is the basic principle of the tigonometrical distance measuring method in the passive system. The above is an ordinary constitution of the passive system, tigonometrical distance measuring apparatus.

It is noted that the shift quantity operating function normally comprises of two processes described later. The two processes may be incorporated into the CPU 40 as software processing.

As stated above, if a photographic focusing lens of the camera is controlled through an actuator such as a motor by the CPU 40 which assumes control of the operation of the camera at the time of adjusting the focus of the camera, it is possible to realize a camera with AF (auto-focus) feature.

In the shift quantity operating processing for obtaining the above shift quantity x, a correlation operation step of examining a shift in units of sensor pitches, i.e., at sensor cell pitches and an interpolation operation step of calculating the shift quantity with higher resolution than that of the former step by interpolation are required as the two processes for operating the image shift quantity on the sensor arrays.

First, the correlation operation step will described.

Figure 5A:
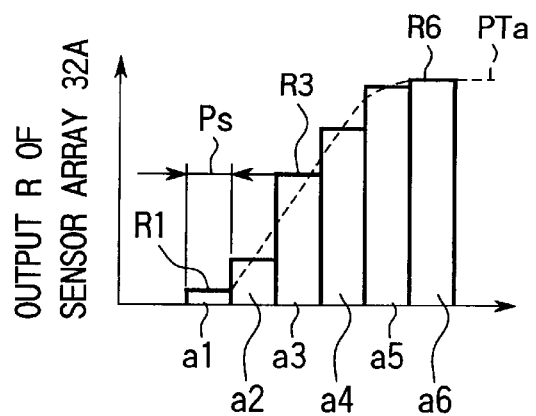
FIGS. 5A and 5B show the luminance patterns of light incident on sensor arrays 32a and 32b shown in FIG. 4 and outputs of sensor cells forming the sensor arrays, respectively.
Figure 5B:
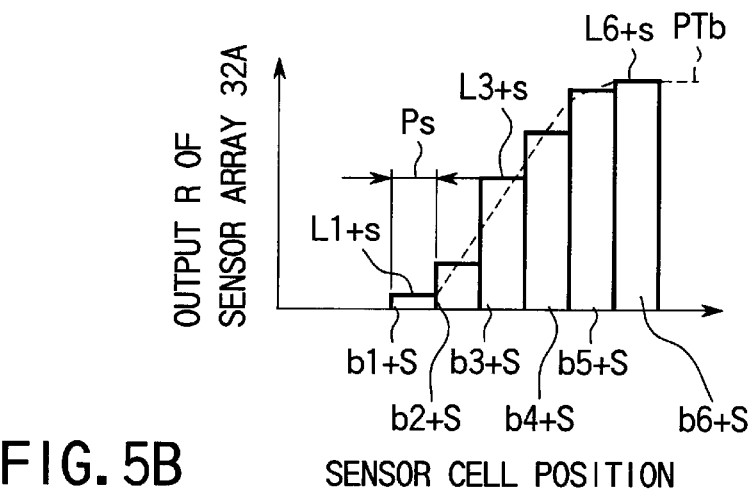

FIGS. 5A and 5B show the relationship between the sensor cell position indicating the luminance pattern of light incident on the sensor arrays 32a and 32b and the outputs of the sensor cells forming the sensor arrays.

In FIG. 5A, the sensor array 32a which is a right (R) sensor, comprises of sensor cells a1 to a6, where indexes 1 to 6 indicate the absolute position of a sensor cell ai based on the optical axis of the light receiving lens 32a.

In FIG. 1B, the sensor array 32b which is a left (L) sensor, comprises of sensor cells b1 to b6 as in the case of the sensor array 32a, where indexes 1 to 6 indicate the absolute position of a sensor cell b1 based on the optical axis of the light receiving lens 32a.

The sensor cell pitch is set at Ps.

Now, if light is incident on the sensor array 32a as a luminance pattern of Pta as indicated by a broken line of FIG. 5A, the magnitudes of the outputs of the sensor cells a1 to a6 in the sensor array 32a are distributed as indicated by a bar graph in FIG. 5A.

At this moment, if light of the same luminance pattern PTb is incident on the sensor array 32b and output patterns of the sensor outputs L1 to L6 of the sensor cells b1 to b6 are not shifted from, i.e., coincide with those of the sensor outputs R1 to R6, respectively, then the shift quantity x is 0 and the object distance Z is infinite.

In addition, if the object is at a finite distance, similar pattern outputs L1+S, L2+S, ..., L6+S of sensor cells b1+S, b2+S, ..., b6+S which are shifted by S, where S is the number of sensor cells, with respect to the sensor cell outputs R1 to R6 shown in FIG. 5A are obtained.

In this case, therefore, it is possible to obtain the shift quantity X from the value of S or the number of the shifted sensor cells.

To obtain the value of S or the number of shifted sensors, a difference added value FF obtained by subtracting an output L of a sensor cell from an output R of a corresponding sensor cell and absolute values added for the respective sensor cells may be used.

First, the sensor cell output L(i) is subtracted from the sensor cell output R(i) while the sensor cells correspond to each other and the absolute value of the difference is obtained. By changing i by a certain width and adding the results, the difference added value FF(i) is obtained.

In other words, the following expression is obtained:

$$FF(i) = \Sigma |R(i) - L(i)|.$$

Next, one of the outputs Ri and Li of the right and left sensor cells is shifted by one cell and the difference of outputs is obtained as in the case of the adjacent sensor cells for which the difference of outputs is obtained. Then, the difference added value FF(i+1) can be represented by the following expression:

$$FF(i+1) = \Sigma |R(i+1) - L(i)|.$$

Figure 6:
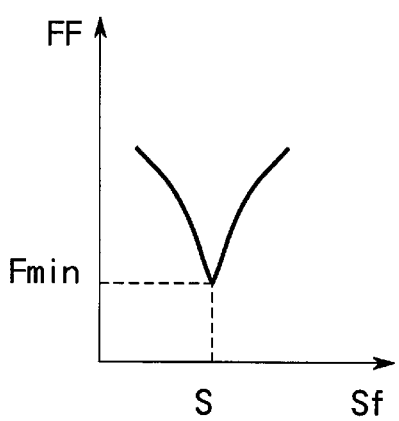
FIG. 6 is a curve showing FF values.

If the variation of the FF value obtained by sequentially changing the shift quantity Sf as explained above is shown as an example for a certain object, a curve of FIG. 6, indicating that the FF value is changed with the shift quantity Sf, is obtained.

In the example of FIG. 6, it is considered that the outputs of the right and left sensor arrays 32a and 32b are balanced at a shift quantity Sf at which the difference added value FF obtained by adding the differences between outputs R and L has a minimum Fmin. The shift quantity Sf at this time becomes the sensor cell shift quantity S.

FIGS. 5A and 5B are the output distributions of both the sensor arrays 32a and 32b which are diagrammatically shown in view of the above sensor cell shift quantity S. That is, a luminance pattern of the output R of the index-added sensor cell ai in the sensor array 32a without shift, as shown in FIG. 5A, and a luminance pattern of the output L of the index-added sensor cell bi+S in the sensor array 32b which is shifted by the shift quantity S as shown in FIG. 5B are obtained.

Therefore, it is necessary to perform an interpolation operation to obtain a shift quantity x with higher resolution based on the sensor cell shift quantity S.

Namely, the image shift quantities on the two sensor arrays 32a and 32b are not shifted according to the sensor cell pitch.

To measure the distance with higher accuracy, it is required to detect image shift quantities at a narrower sensor cell pitch.

This process is referred to as an 'interpolation operation' which will be described based on FIGS. 7A through 7D showing outputs of the respective sensor arrays.

The outputs R and L in FIGS. 7A through 7D denote outputs of part of sensor cells in the sensor arrays 32a and 32b shown in FIG. 4, respectively. FIGS. 7A through 7D are arranged for the sake of comparison, while indicating a state in which the above-stated correlation operation is finished and in which the outputs are shifted by the above shift quantity S.

Therefore, the outputs L0 to L4 in FIGS. 7A through 7D should be actually described as LS to LS+4 which are outputs shifted by S. However, the shift quantity S is not shown therein to avoid making drawing appear.

Figure 7A:
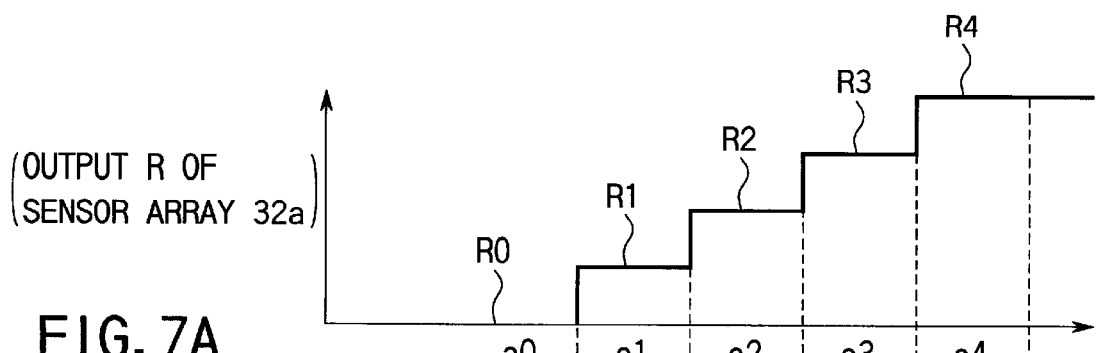
FIGS. 7A through 7D show the outputs of the sensor arrays 32a and 32b in FIG. 4, respectively.
Figure 7B:
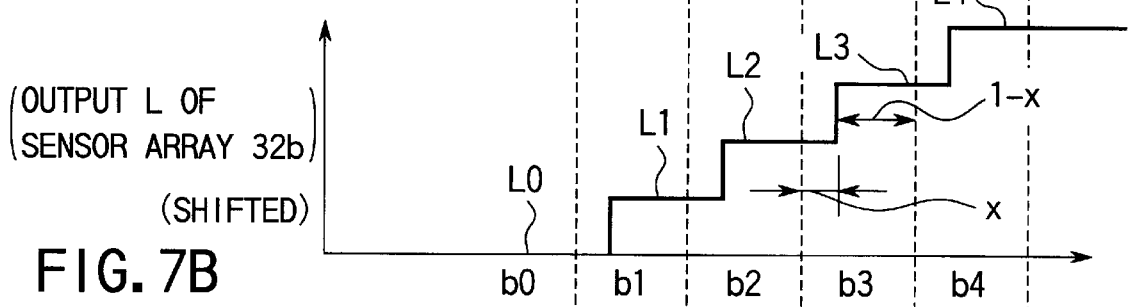
Figure 7C:
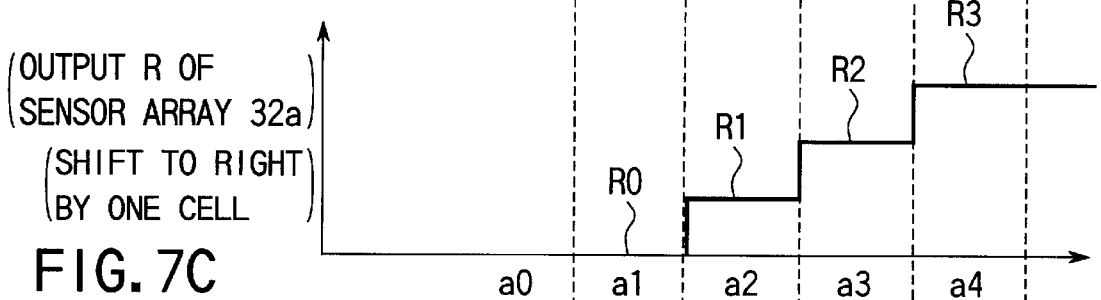
Figure 7D:
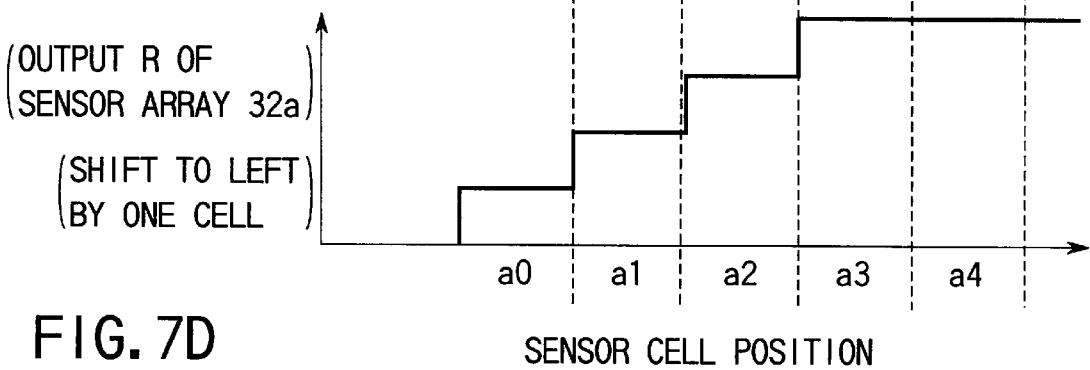

As shown in FIG. 7B, it is assumed that light shifted by position x within a cell pitch is incident on the left sensor array 32b having output L, even after shifted by the shift quantity S and that the output L is based on the output R of the right sensor array 32a.

At this moment, a mixture of light incident on the sensor cells a0 and a1 having the outputs R0 and R1, respectively, is incident on the sensor cell b1 having an output L1. Likewise, light shifted by position X with reference to standard R is sequentially incident on the sensor cell bi having an output Li. Thus, the output Li is represented by the following Expression (2):

L1=(1-x)·R1+x·R0,

L2=(1-x)·R2+x·R1, and

L3=(1-x)·R3+x·R2. (2).

In addition, Fmin and the difference added values F−1 and F+1, obtained when the shift quantity is shifted from the sensor cell position at which the minimum Fmin is obtained, by one sensor cell in positive direction and negative direction, respectively are expressed by using output values of Rn and Ln as the following Expression (3):

Fmin=Σ|Rn−Ln|,

F−1=Σ|$R_{n-1}$−Ln|, and

F+1=Σ|$R_{n+1}$−Ln| (3).

Further, if the Expression (3) is expanded using obtained:

$$Fmin = |R1 - L1| + |R2 - L2| + |R3 - L3| \quad (4)$$
$$= |R1 - (1 - x) \cdot R1 - x - R0| +$$
$$|R2 - (1 - x) \cdot R2 - x \cdot R1| +$$
$$|R3 + (1 - x) \cdot R3 - x \cdot R2|$$
$$= x \cdot |R1 - R0| + x \cdot |R2 - R1| + x \cdot |R3 - R2|$$
$$= x \cdot \{|R1 - R0| + |R2 - R1| + |R3 - R2|\}$$
$$F - 1 = |R0 - L1| + |R1 - L2| + |R2 - L3|$$
$$= |R0 - (1 - x) \cdot R1 - x \cdot R0| +$$
$$|R1 - (1 - x) \cdot R2 - x \cdot R1| +$$
$$|R2 - (1 - x) \cdot R3 - x \cdot R2|$$
$$= |(1 - x) \cdot (R0 - R1)| + |(1 - x) \cdot (R1 - R2)| +$$
$$|(1 - x) \cdot (R2 - R3)|$$
$$= (1 - x) \cdot \{|R0 - R1| + |R1 - R2| + |R2 - R3|\}$$
$$F + 1 = |R2 - L1| + |R3 - L2| + |R4 - L3|$$
$$= |R2 - (1 - x) \cdot R1 - x \cdot R0| +$$
$$|R3 - (1 - x) \cdot R2 - x \cdot R1| +$$
$$|R4 - (1 - x) \cdot R3 - x \cdot R2|$$
$$= x \cdot \{|R1 - R0| + |R2 - R1| + |R3 - R2|\} +$$
$$|R2 - R1| + |R3 - R2| + |R4 - R3|.$$
$$\approx (1 + x) \cdot \{|R0 - R1| + |R1 - R2| + |R2 - R3|\}$$

where it is assumed that |R1−R0| is nearly equal to |R4−R3|.

In Expression (4), if {|R0−R1|+|R1−R2|+|R2−R3|} is replaced by (ΣΔR), by (ΣΔR),

Fmin=x·(ΣΔR),

F−1=(1−x)·(ΣΔR), and

F+1=(1+x)·(ΣΔR).

Hence, the following expression indicating the relationship between F and shift quantity x is obtained:

$$(F - 1 - Fmin)/(F + 1 - Fmin) = \{(1 - x) \cdot \left(\sum \Delta R\right) - \quad (5)$$
$$\left(\sum \Delta R\right)\}/\{(1 + x) \cdot$$
$$\left(\sum \Delta R\right) - x \cdot \left(\sum \Delta R\right)\}$$
$$= (1 - 2 \cdot x) \cdot \left(\sum \Delta R\right)/$$
$$\left(\sum \Delta R\right)$$
$$= (1 - 2 \cdot x).$$

As shown in Expression (5), it is possible to obtain the shift quantity x from the values of Fmin, F−1 and F+1 without depending on the value of (ΣΔR).

This is an interpolation operation which is performed in the operating circuit 35 of FIG. 4. It may be performed in accordance with a predetermined program in the CPU 40, such as a one-chip microcomputer, serving as operation control means.

Next, the distance measuring operation in the other mode or active AF mode in the distance measuring apparatus in this embodiment will be described in more detail.

Before describing the distance measuring operation in the other mode or active AF mode in the distance measuring apparatus in this embodiment, the principle of the active AF distance measuring operation will be described.

Figure 8:
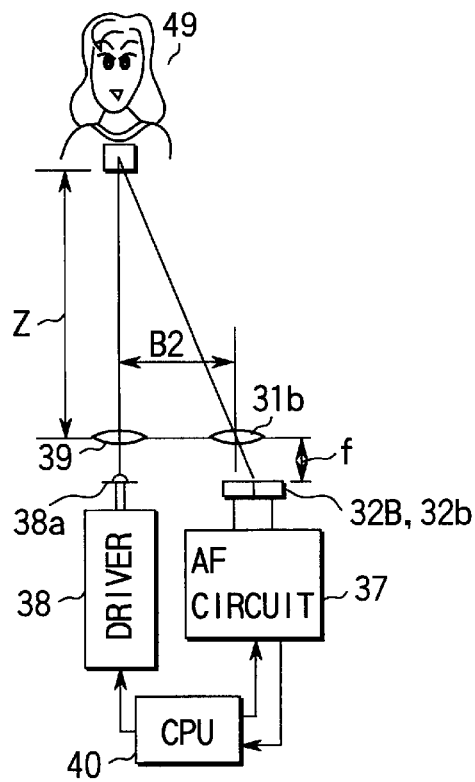
FIG. 8 shows the principle of an active AF distance measurement.

FIG. 8 shows the principle of active AF distance measurement. Description will be given with a half-division sensor 32B instead of the sensor array 32b used in the constitution of the distance measuring apparatus in this embodiment.

That is, the LED 38a emits pulse-like distance measurement light toward the object 49 through the light projecting lens 39.

The output of the distance measurement reflection signal light, reflected by the object 49, is incident on the half-division sensor 32B through the light receiving lens 31b. Since the reflection signal light is pulse-like light opposed to the background light constantly incident on the sensor, the signal light is separated by the AFIC 37 using frequency difference and timing.

Figure 9:
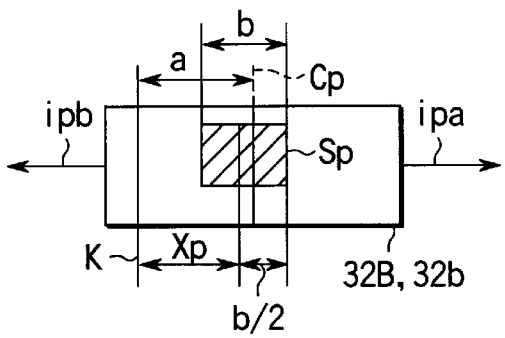
FIG. 9 shows a state of a reflection signal light spot Sp having a width of b formed on a half-division sensor 32B.

FIG. 9 shows the state of a reflection signal light spot Sp having a width of b which image is formed on the half-division sensor 32B.

While it is assumed that the object distance is Z, the distance between the light projecting lens and the light receiving lens is B2 and the focal distance of the light receiving lens is f, then the center of the spot Sp enters a position xp which satisfies the following relationship:

$$Xp = B2 \cdot f/Z \qquad (6).$$

Also, if the light spot Sp having a width of b about the center of a position at a distant xp from a reference point K is incident on the half-division sensor 32B and the sensor 32B outputs photocurrent according to the area of the spot Sp incident on the sensor 32B, then two photocurrents ipa and ipb satisfy the following relationship:

$$ipa = ip \cdot (Xp + b/2 - a)/b$$

$$ipb = ip \cdot (-Xp + b/2 + a)/b \qquad (7)$$

where a is a distance from the reference K to a division point Cp on the halved sensor array 32b.

Symbol ip is total signal photocurrent. If the photocurrents ipa and ipb are added, the ip is obtained.

Therefore, if ipa/(ipa+ipb) is calculated by the processing circuit in the AFIC 37 for these two photocurrents, a signal dependent on the position Xp is obtained in the form of (Xp+b/2−a)/b.

Since the above stated values a, b and the like are constant, the object distance Z is obtained using this signal by Expression (6) at the CPU 40.

Now, in case of measuring a distance in the active AF mode in the distance measuring apparatus in this embodiment, the above-mentioned sensor array 32b is applied as the half-division sensor 32B in the distance measuring apparatus in FIG. 8.

It is noted that the apparatus in this embodiment is the same as that of FIG. 8 in constitution except for the sensor array 32b and the switching circuit 33 for switching the output of the array 32b.

Namely, the distance measuring apparatus comprises the LED 38a and the light projecting lens 39, which serve as the light projecting means, for applying pulse-like distance measurement light toward the object 49, the light receiving lens 31b introducing the reflection signal light of the object 49, the AFIC 37 separating the reflection signal light as pulse signal light and performing distance measuring operation and the like.

Figure 10:
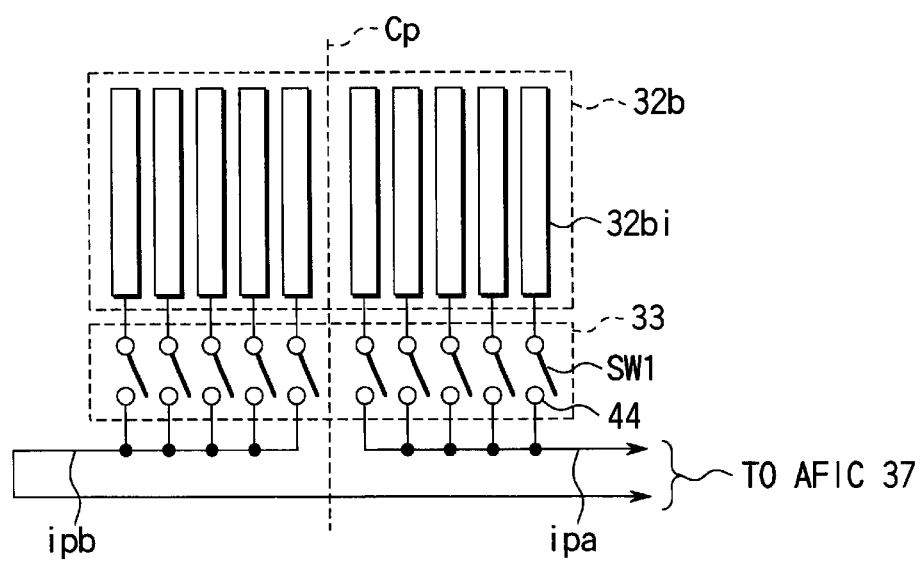
FIG. 10 is a circuit diagram showing the connection of the sensor arrays.

In this distance measuring apparatus, as shown in the circuit diagram of sensor array connection of FIG. 10, the outputs of the respective cells in the sensor array 32b are halved at the half-division point Cp, combined by the switching circuit 3 and outputted to the AFIC 37 as photocurrents ipa and ipb.

With this constitution, i.e., if the cell pitch of the cell array 32 is sufficiently narrow compared with that in the distance measuring apparatus which employs the half-division sensor 32B shown in FIG. 8 and the respective sensor cells 32b1 in the sensor divided by half as shown in FIG. 10 are used as a unit, the apparatus in FIG. 10 can exhibit the same advantage as that of FIG. 8.

In other words, in the active AF mode, if the outputs of the sensor array 32b are combined by the switching circuit 33 to output two photocurrents like the half-division sensor 32B, it is possible to obtain a signal dependent on the distance Xp from the reference position K to the center of the light spot as shown in FIG. 9 from the Expression (7) and to obtain the object distance Z from the Expression (6) by conducting the same signal processing.

According to the present distance measuring apparatus, the switching operation of the switching circuit 33 allows the outputs of the sensor array 32b used for the distance measurement in the passive AF mode to be changed to a combined output state as shown in FIG. 10 in the active AF mode and photocurrents ipa and ipb to be outputted.

In this way, according to the present distance measuring apparatus, the distance can be measured in the passive AF mode and the active AF mode using the same cell array by switching operation.

Next, description will be given of an example of a method of A/D converting the outputs of the respective sensor cells in the sensor array in the passive AF mode in the distance measuring apparatus in the above embodiment, while referring to the circuit diagram shown in FIG. 11 and the amplifier output waveform view shown in FIG. 12.

Figure 11:
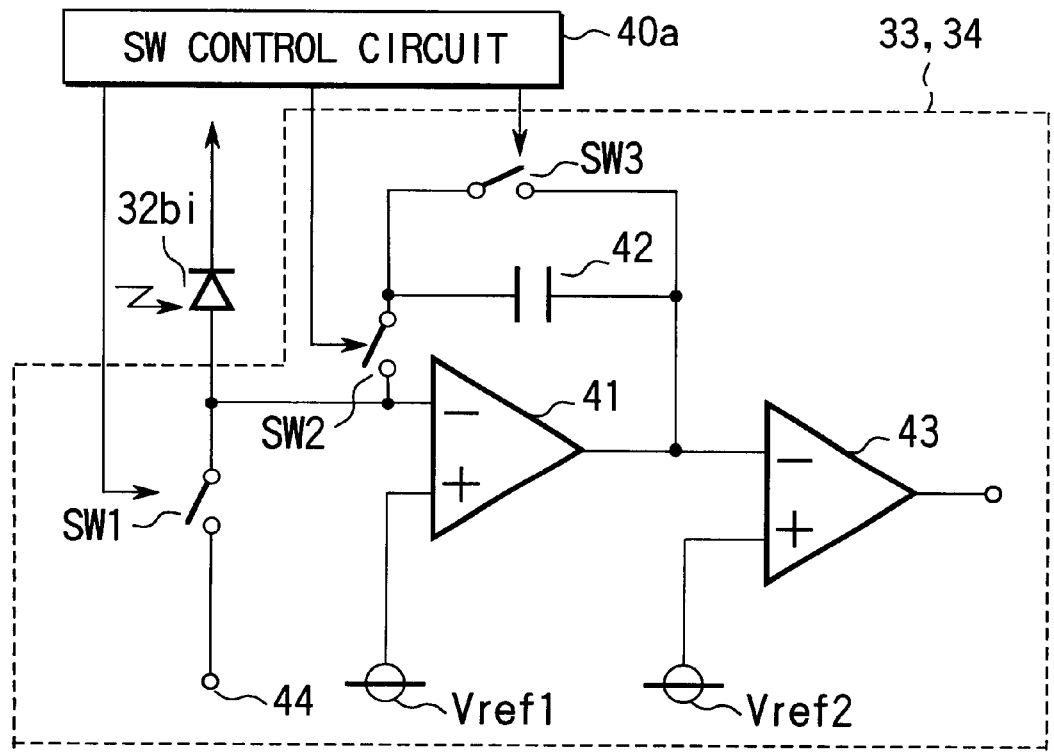
FIG. 11 is a circuit diagram for realizing a method of A/D converting the outputs of the respective sensor cells in the censor arrays in a passive AF mode.
Figure 12:
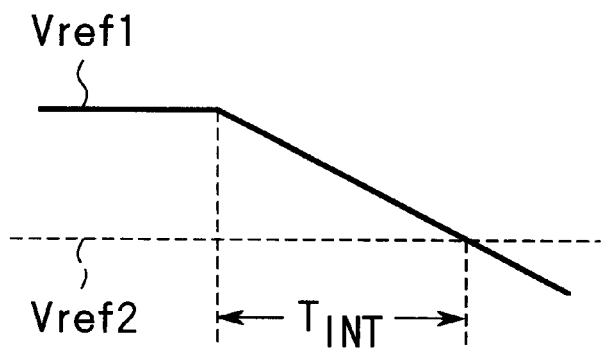
FIG. 12 is an amplifier output waveform view for realizing a method of A/D converting the outputs of the respective sensor cells in the sensor arrays in a passive AF mode.

FIG. 11 is a circuit diagram showing details of a sensor cell 32bi which is a light receiving device forming the sensor array 32b shown in FIG. 4, the switching circuit 33 switching the output of the sensor cell 32bi and the integrating circuit.

Although the following description concerns the A/D conversion operation for the output of the left sensor array 32b, the same A/D conversion operation is carried out for the right sensor array 32a, as well.

In case of the right sensor array 32a, however, a switch-over switch SW1 and a terminal 44 for switching operation in the active AF mode, which will be described later, are not provided.

The light receiving sensor cell 32bi of the sensor array 32 outputs a photocurrent according to the intensity of the incident light.

If switch-over switches SW1 and SW2 of the switching circuit 33 are turned off and on, respectively by a switch (SW) control circuit 40a incorporated in the CPU 40, the photocurrents are integrated and converted into voltages by the function of an integrating amplifier 41 and an integrating capacitor 42 which use the first reference voltage Vref1 as a reference voltage.

The outputs are inputted to a comparator 43 and compared with a second reference voltage Vref2.

Before starting the integrating operation, if the switch-over switch SW3 is turned on by the switch control circuit 40a and then turned off, the output control circuit 40a and then turned off, the output of the integrating amplifier 41 is first fixed to the reference voltage Vref1.

Thereafter, as stated above, the integrated voltage is changed depending on the magnitude of photocurrent, i.e., on light intensity.

A comparator 43 determines time TINT required until the integrated voltage reaches the reference voltage Vref2.

If incident light is larger in quantity, the time TINT is shorter. If smaller, integrating operation is slower and the time TINT is longer.

By determining time TINT until the integrated voltage reaches the reference voltage Vref2 for the respective sensor cells 32bi, as described above, the intensity of light incident on the respective sensor cells 32bi can be obtained digitally and a signal indicating an object condition can be obtained.

It is possible to change the sensitivity in accordance with variety of light by switching the capacity of the integrating capacitor 42 using a switch and thereby controlling integration speed.

In case of measuring a distance in the active AF mode, by contrast, the switch-over switch SW2 is turned off and the SW1 is turned on.

In this switch-over state, photocurrent is outputted from the terminals 44.

The terminals 44 are bound together as shown in the circuit diagram of FIG. 10 and connected to the AFIC 37 having the above-stated functions, thereby making it possible to detect reflection signal light when the LED emits distance measuring light.

Next, the switching of the active system and the passive system as well as the advantage thereof in the second embodiment according to the present invention will be described with reference to the drawings.

Figure 14:
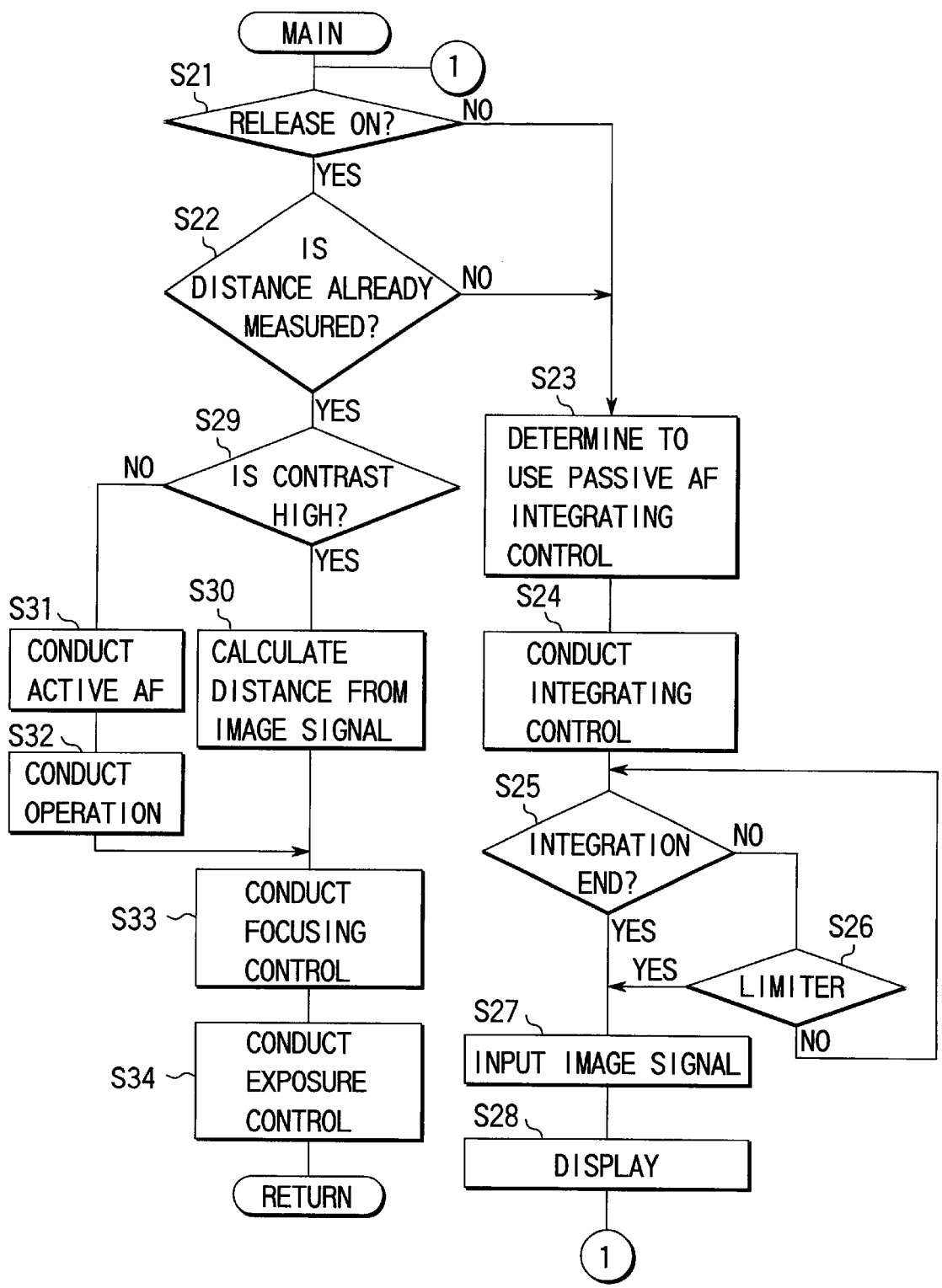
FIG. 14 is a flow chart for describing a control sequence for a camera with a distance measuring apparatus in the second embodiment according to the present invention.

FIG. 14 is a flow chart showing a control sequence in the second embodiment according to the present invention.

This control sequence is characterized in that not only display but also the following distance measuring sequence steps are carried out before the release switch (or remote control switch) 41 is depressed.

Specifically, it is determined how long it will take to conduct integrating control from the luminance of the object, characters of the image and the like (in step S23) and then integrating control is carried out (in step S24).

Normally, it is quite likely that a photographer does not yet precisely decide on the composition of a photograph before he or she depresses the release switch 41. It is, thus, necessary to measure a distance in a real-time manner at high speed before the operation of the release switch 41.

Taking this into consideration, in this embodiment, a limiter is set such that integrating operation is finished after a predetermined time even if the operation is not sufficient yet, to move to the next step (in steps S25, S26).

The image signal thus obtained is always monitored by the CPU 40 (in step S27).

Figure 13:
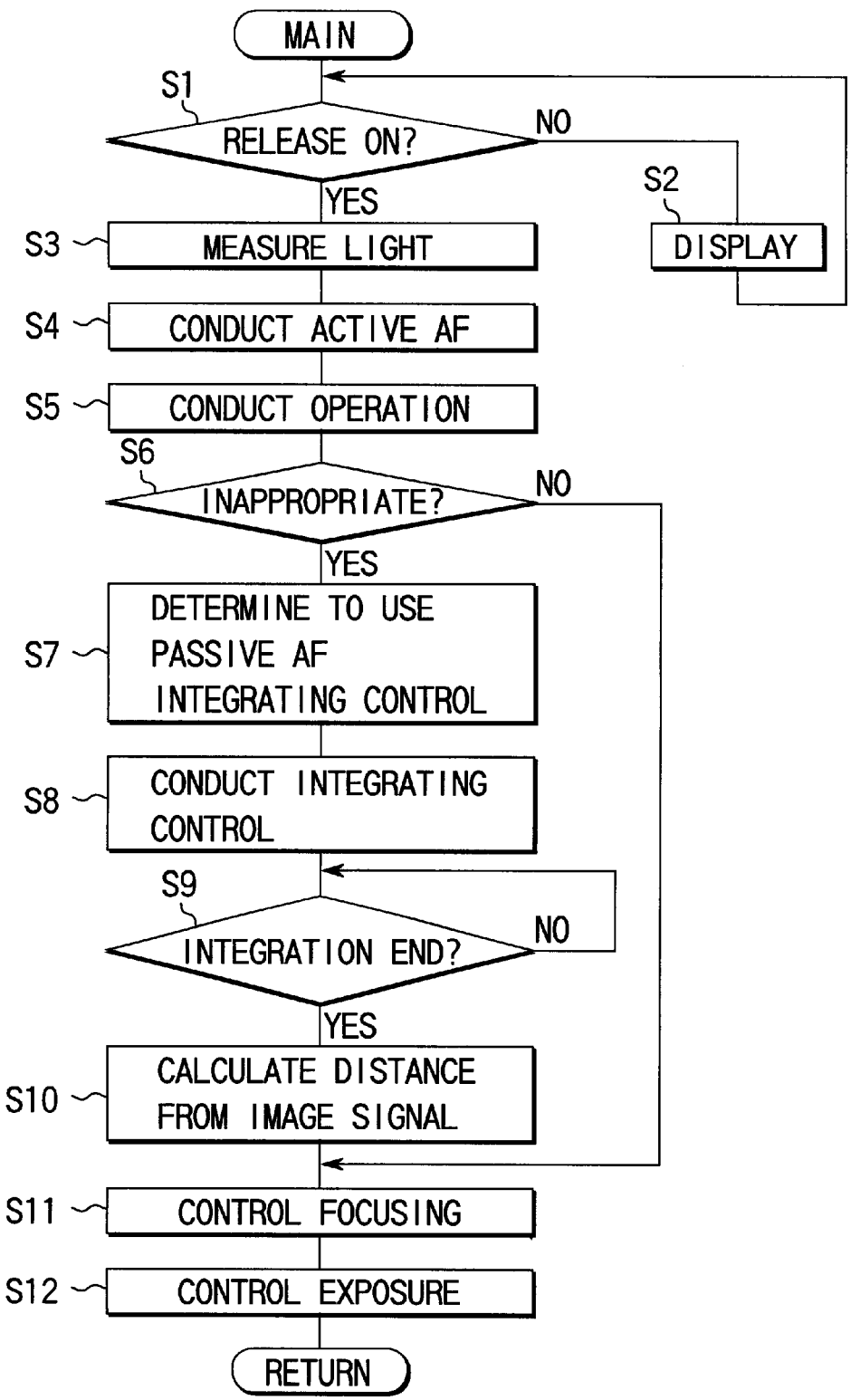
FIG. 13 is a flow chart for describing an ordinary control sequence when a camera having two AF systems, i.e., an active system and a passive system according to the conventional technique conducts focusing control.

In the same manner as the step 2 of FIG. 13, a display step is executed (in step S28).

Thereafter, if the release switch 41 is depressed (in step S21) and the distance is already measured (in step S22), then it is detected whether or not the image signal obtained has a contrast (in step S29). If the image signal has a contrast, the distance to the object is calculated using the image signal which has been previously obtained and focusing control is carried out (in steps S30, S33). Thereafter, exposure control is carried out (in step S34).

Now, the photographer naturally wants to monitor the image signal in a real-time manner before the operation of the release switch 41. Due to this, the distance calculation is characteristically made at a timing after the operation of the release switch 41 for the purpose of shortening the processing time as much as possible.

In that case, no distance measurement operation is carried out after the operation of the release switch 41, so that release operation can be conducted without time lag.

On the other hand, if the image signal obtained does not have a contrast (in step S29), the distance measurement by the passive AF is inappropriate and the operation of the active AF is executed (in steps S31, S32). Thereafter, focusing control and exposure control are conducted (in steps S33, S34).

As stated above, according to the second embodiment, it is possible to realize highly accurate AF without undesired objects by taking good advantage of the active AF and the passive AF and, therefore, to provide a camera with a distance measurement apparatus with less release time lag.

Now, an application of the second embodiment will be described.

There is normally known a so-called multi-AF technique for points of steps in the plane and determining a focusing distance if an object is not present at the center of the frame as shown in FIG. 17.

However, if the background is, for example, a night piece, integrating operation is limited by the light of the background while detecting an image by means of the passive AF. As a result, an image of an object (a man) cannot be obtained and the man's image is blurred.

Taking the above disadvantage into consideration, in this application, a point without contrast in an image signal is searched and the active AF is executed to the point, thereby making it possible to measure the distance to a low contrast portion, as shown in FIG. 15.

In this example, as shown in FIG. 15, a plurality of light projecting devices 51 are connected to a selective driver 52 controlled by the CPU 57. A light projecting lens 50 is provided on the optical axis of the light emitted by the light projecting device 51.

There are also provided light receiving lenses 53 and 54 for forming an image of reflection light and a sensor array 55 in the back of the lenses.

The output of the sensor array 55 is connected to the input of the CPU 57 through the A/D converter 56.

As described above and also as can be seen from FIG. 15, a plurality of light projecting devices 51 are required. The devices 51 are selected in accordance with the detected low contrast point and the selected device emits light.

Figure 16:
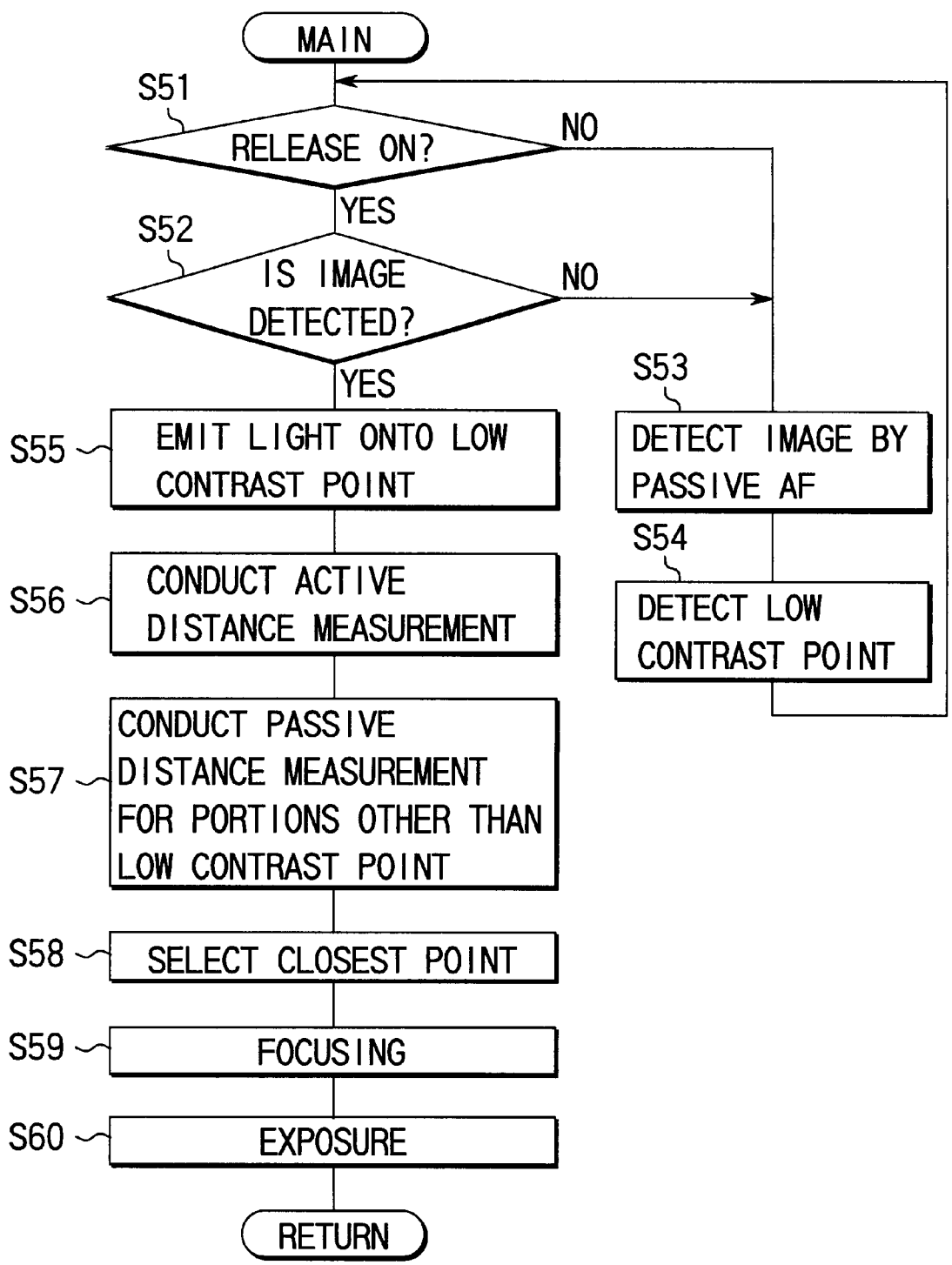
FIG. 16 is a flow chart for describing the operation of the application of the camera with a distance measuring apparatus in the second embodiment according to the present invention.

Furthermore, as shown in the flow chart of FIG. 16, the low contrast point is detected in advance by a passive sensor during the distance measurement conducted prior to the release operation, which is a characteristic feature of the present invention (in steps S51, S53, S54).

Specifically, a low contrast point is detected by the CPU 52 from the image obtained by the passive sensor (in steps S51 to S54). The detected point is applied with light after release operation and the distance to the detected point is measured based on the principle of the active AF (in step S56).

In this way, a low contrast portion is subjected to the active AF, whereas a high contrast portion is subjected to the passive AF. It is, therefore, possible to measure the distance to an object for which the active or passive AF can fulfil its function satisfactorily. Thus, accurate multi-AF can be realized (in step S57).

Based on the result thus obtained, the shortest distance is selected, for example, and focusing and exposure controls are conducted (in steps S58 to 60).

As a result, it is possible to accurately focus on a man even if the man is in a scene such as that shown in FIG. 17.

As stated so far, according to the present invention, it is possible to accurately conduct focusing control even if a main object has a low contrast, as a man in the dark, by taking full advantage of the active AF.

Conversely, according to the present invention, if there is an object having a high contrast for which the active AF cannot fulfil its function, a suited and most effective distance measuring method is selected to thereby allow high-speed focusing.

As stated so far in detail, the present invention includes two systems different in focusing operation to thereby eliminate objects difficult to deal with and determines which system to be adopted before release operation. Hence, the present invention can provide a camera with a distance measurement apparatus having a quick response.

Namely, since the present invention has distance measuring functions by means of both the active and passive AF systems, it is possible to measure distances to objects in a wide variety of conditions. As a result, it is possible to solve the problem of missing shutter timing due to release time lag and further to provide a camera with a distance measuring apparatus which can realize a small-size, high-speed camera system.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera with a distance measuring apparatus comprising:

light projecting means for projecting signal light onto an object;

first signal means, having light receiving means for receiving a reflection signal of the signal light from the object, for forming a first signal used for measuring a distance to the object;

second signal means, having image signal detecting means for detecting an image signal of the object, for forming a second signal used for measuring the distance to the object;

photographing start detecting means for detecting operation of a photographing start operating means for operating the camera when a photographer is to take a photograph;

actuating means for setting the camera in an operating state; and control means for obtaining one of the first and second signals used for measuring the distance to the object by actuating one of the first and second signal means before the photographing start detecting means detects operation of the photographing start operating means and after actuating the actuating means, and for determining a priority as to actuating one of the first and second signal means at a timing after the photographing start detecting means detects the operation of the photographing start operating member based on the obtained signal.

2. A camera with a distance measuring apparatus according to claim 1, wherein:

the control means repeatedly actuates one of the first and second signal means after actuation by the actuating means, and determines the priority as to actuating one of the first and second signal means based on one of the first and second signals used for measuring the distance to the object obtained just before the photographing start detecting means detects the operation of the photographing state operating member.

3. A camera with a distance measuring apparatus according to claim 1, wherein:

the second signal means includes image pickup means for picking up an image of the object formed by a photographing optical system.

4. A camera with a distance measuring apparatus according to claim 3, wherein:

the first signal means is actuated before the photographing start detecting means detects the operation of the photographing start operating member.

5. A camera with a distance measuring apparatus according to claim 1, wherein:

the light receiving means of the first signal means and the image signal detecting means of the second signal means comprise a common series of light receiving devices.

6. A camera with a distance measuring apparatus according to claim 5, wherein:

the second signal means is actuated before the photographing start detecting means detects the operation of the photographing start operating member.

7. A camera with a distance measuring apparatus according to claim 1, wherein:

if the second signal means is actuated before the photographing start detecting means detects the operation of the photographing start operating member, then (i) an operation of measuring the distance to the object is not performed before the photographing start detecting means detects the operation of the photographing start operating means, (ii) operations until the image signal detecting means detects the image signal are conducted, and (iii) the operation of measuring the distance to the object is performed after the photographing start detecting means detects the operation of the photographing start operating member.

8. A camera with a distance measuring apparatus comprising:

a first signal forming unit having a light projecting unit that projects distance measurement light onto an object and a light receiving unit that receives a reflection signal of the distance measurement light from the object, said first signal forming unit forming a first focusing signal for the object based on the received reflection signal;

a second signal forming unit having an image signal detecting unit that detects a luminance distribution state of the object, said second signal forming unit forming a second focusing signal for the object based on the detected luminance distribution state of the object;

a release detecting unit that detects when a photographer has operated a release operating member;

an object condition detecting unit that detects that an object condition based on a signal obtained by operating one of the first signal forming unit and the second signal forming unit before operation of the release operating member; and a selective control unit that selectively controls use of one of the first signal forming unit and the second signal forming unit so as to obtain one of the first and second focusing signals based on a detection result of the object condition detecting means if the release detecting means has detected the operation of the release operating member.

9. A camera with a distance measuring apparatus comprising:
- a first signal forming unit having a light projecting unit that projects distance measurement light onto an object and a light receiving unit that receives a reflection signal of the distance measurement light from the object, said first signal forming unit forming a first focusing signal for the object based on the received reflection signal;
- a second signal forming unit having an image signal detecting unit that detects a luminance distribution state of the object, said second signal forming unit forming a second focusing signal for the object based on the detected luminance distribution state of the object;
- a release detecting unit that detects when a photographer has operated a release operating member;
- an object condition detecting unit that detects an object condition based on a signal obtained by actuating the first signal forming unit before operation of the release operating member; and
- a selective control unit that selectively controls use of one of the first signal forming unit and the second signal forming unit so as to obtain one of the first and second focusing signals based on a detection result of the object condition detecting means if the release detecting means has detected the operation of the release operating member.

10. A camera with a distance measuring apparatus comprising:
- a first signal forming unit having a light projecting unit that projects distance measurement light onto an object and a light receiving unit that receives a reflection signal of the distance measurement light from the object, said first signal forming unit forming a first focusing signal for the object based on the received reflection signal;
- a second signal forming unit having an image signal detecting unit that detects a luminance distribution state of the object, said second signal forming unit forming a second focusing signal for the object based on the detected luminance distribution state of the object;
- a release detecting unit that detects when a photographer has operated a release operating member;
- an object condition detecting unit that detects an object condition based on a signal obtained by actuating the image signal detecting unit of the second signal forming unit before operation of the release operating member; and
- a selective control unit that selectively controls use of one of the first signal forming unit and the second signal forming unit one of the first signal forming means and the second signal so as to obtain one of the first and second focusing signals based on a detection result of the object condition detecting means if the release detecting means has detected the operation of the release operating member.

11. A camera with a distance measuring apparatus according to claim 10, wherein:
- if the selective control unit selects the second signal forming unit, an operation for focusing on the object is started based on the second focusing signal formed by the second signal forming unit.

12. A camera with a distance measuring apparatus comprising:
- first distance measuring means, having a plurality of light emitting means for measuring distances to a plurality of points in an image plane, for projecting distance measurement light from the light emitting means onto an object in the image plane and for receiving and utilizing portions of the distance measurement light reflected by the object to measure a distance to the object;
- second distance measuring means for utilizing an image signal pattern of the object in the image plane to also measure the distance to the object;
- determining means for determining an object condition based on an image signal outputted by actuating the second distance measuring means; and
- control means for selecting one of the plurality of light emitting means included in the distance measuring means to allow the selected light emitting means to project the distance measurement light therefrom based on an output result of the determining means.

13. A camera with the distance measuring apparatus according to claim 12, wherein:
- the camera includes release detecting means for detecting operation of a release operating member;
- the determining means determines the object condition based on the image signal outputted by actuating the second distance measuring means before operation of the release operating member; and
- the control means selects one of the plurality of light emitting means included in the first distance measuring means to allow the selected light emitting means to project the distance measurement light therefrom based on the output result of the determining means after the release detecting means has detected the operation of the release operating member.

14. A camera adapted to measure distances from a plurality of points within a screen to an object, comprising:
- a detecting unit that detects a luminance distribution state of the object;
- a passive distance measuring unit that measures distances from the points to the object based on an output of the detecting unit;
- an active distance measuring unit that projects distance measurement light onto the object and that measures distances from the points to the object based on a light receiving position of reflection light from the object after the distance measurement light is projected on the object;
- a contrast determining unit that determines whether or not a contrast at each of the points is low based on an output signal of the detecting unit;
- a selective controlling unit that selectively obtains an output signal from the active distance measuring unit with respect to one or more of the points at which the contrast is determined by said contrast determining unit as being low, and that selectively obtains an output signal of the passive distance measuring unit with respect to one or more of the points at which the contrast is determined by said contrast determining unit as not being low.

15. A camera according to claim 14, wherein:
- the camera includes a switch that outputs a photographing start signal; and
- the selective controlling unit selectively controls driving of a photographing lens based on an output signal of the contrast determining unit before the switch is operated.

16. A camera adapted to measure distances from a plurality of points within a screen to an object, comprising:
- image detecting means for detecting an image of the object;

first focusing signal forming means for forming a first focusing signal with respect to each of said points in accordance with an output of the image detecting means;

second focusing signal forming means for projecting distance measurement light onto the object, for detecting a position of reflection light reflected from the object at each of said points, and for forming a second focusing signal; and control means for operating the first focusing signal forming means when the distance measurement light is not projected onto the object, for determining whether or not a contrast at each of said points is low based on a result of signal formation by the first focusing signal forming means, and for causing the second focusing signal forming means to be actuated with respect to one or more of the points whose contrast is determined as being low.

17. A camera according to claim 16, wherein:

the camera includes switching means for detecting a photographing timing; and the control means comprises means for determining whether or not to actuate the second focusing signal forming means when an output of the switching means is input thereto.

18. A camera according to claim 16, further comprising a lens driving unit for driving a photographing lens so as to cause the photographing lens to focus on the object in association with a closest one of the points, based on output signals from the active and passive distance measuring units.

19. A camera comprising:

image detecting means for detecting an image of an object;

first focusing signal forming means for forming a first signal for focusing the camera on the object in accordance with an output of the image detecting means;

second focusing signal forming means for projecting distance measurement light in a plurality of directions in an image plane, and for detecting a position of reflection light from the object; and selecting means for causing the distance measurement light to be projected in selected ones of the plurality of directions in accordance with an output signal of the image detecting means after actuating the image detecting means and at a timing before actuating the first focusing signal forming means.

20. A distance measuring method for a camera having a plurality of light projecting units that each project distance measurement light to a respective one of a plurality of points, said method comprising:

a first step of detecting images of objects which are located at the points;

a second step of selecting one of the plurality of light projecting units as a light projecting unit for use in distance measurement based on the images of the objects detected in the first step;

a third step of projecting distance measurement light from the selected light projecting unit, detecting a position of light reflected back from an associated one of the objects, and then producing a first signal for use in focusing based on the detected position; and a fourth step of producing a second signal for use in focusing based on the images of the objects detected in the first step.

21. A distance measuring method according to claim 20, wherein in the fourth step, the second signal for use in focusing is produced relating to at least one of the plurality of points onto which distance measurement light is not projected in the third step.

22. A distance measuring method according to claim 20, which further comprises a step of selecting one of the points that is associated with one of the objects that is closer to the camera than any other one of the objects, based on the first signal produced in the third step and the second signal produced in the fourth step.

23. A distance measuring method according to claim 20, wherein in the second step, contrasts of the images of the objects are compared with a predetermined value, and the light projecting unit for use in distance measurement is selected based on a result of the comparison.

* * * * *